US012807214B2

(12) United States Patent
Semjonovs et al.

(10) Patent No.: US 12,807,214 B2
(45) Date of Patent: Nov. 24, 2026

(54) DUAL MOTOR DRIVE ASSEMBLY

(71) Applicant: ZF Automotive UK Limited, Solihull (GB)

(72) Inventors: Aleksejs Semjonovs, Snohomish, WA (US); Christos Prevezianos, Birmingham (GB)

(73) Assignee: ZF Automotive UK Limited, Solihull (GB)

( * ) Notice: Subject to any disclaimer, the term of this patent is extended or adjusted under 35 U.S.C. 154(b) by 541 days.

(21) Appl. No.: 18/362,447

(22) Filed: Jul. 31, 2023

(65) Prior Publication Data

US 2024/0051596 A1 Feb. 15, 2024

(30) Foreign Application Priority Data

Aug. 9, 2022 (GB) ..................................... 2211649

(51) Int. Cl.
*B62D 5/04* (2006.01)

(52) U.S. Cl.
CPC ........... *B62D 5/046* (2013.01); *B62D 5/0403* (2013.01); *B62D 5/0409* (2013.01)

(58) Field of Classification Search
CPC ..... B62D 5/046; B62D 5/0403; B62D 5/0409
USPC ................................................. 180/443, 444
See application file for complete search history.

(56) References Cited

U.S. PATENT DOCUMENTS

2020/0172150 A1* 6/2020 Wilkes ................. B62D 5/0442
2020/0343849 A1* 10/2020 Coroban-Schramel ...................... H02P 29/02
2021/0107557 A1 4/2021 Wilkes
2021/0107560 A1* 4/2021 Wilson-Jones ........ B62D 5/006

FOREIGN PATENT DOCUMENTS

WO WO-2005092689 A1 * 10/2005 ............... B62D 6/00

* cited by examiner

*Primary Examiner* — Jacob D Knutson
(74) *Attorney, Agent, or Firm* — Kristin L. Murphy

(57) ABSTRACT

A dual motor drive assembly includes a housing, a shaft rotatably mounted with respect to the housing, a first gear connected to and configured to rotate with the shaft, first and second motors, each having an output driving a respective output gear. The output gears are engaged with the first gear. The dual motor drive assembly also includes a controller for allocating torque demands to each of the first and second motors, wherein a threshold torque demand is assigned to each motor, the threshold torque demand being lower than the maximum torque output of the motor.

19 Claims, 9 Drawing Sheets

DUAL MOTOR DRIVE ASSEMBLY

CROSS-REFERENCE TO RELATED APPLICATION

This application claims priority to GB Priority Application No. 2211649.5, filed Aug. 9, 2022, the disclosure of which is incorporated herein by reference in its entirety.

TECHNICAL FIELD

This disclosure relates to a dual motor drive assembly, in particular but not exclusively suitable for use in a handwheel actuator (HWA) assembly of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver grips and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor coupled to the steering wheel. The secondary motor provides the driver with the appropriate resistance and feedback in response to specific user inputs at the steering wheel to mimic the feel of a conventional steering system.

In a steer-by-wire system, a malfunction or failure of a portion of the assembly may impair the ability to steer the vehicle. As a result, it is desirable to provide the assembly with structure for providing at least temporary fail-safe operation. US 2006/0042858 A1 discloses steering apparatus including a steering assembly that includes a handwheel actuator. The handwheel actuator includes a steering column for supporting a steering wheel, a gear mechanism and two motors, each for providing a torque to the steering column.

SUMMARY

GB 2579374 A discloses a steering column assembly for use with a steer-by-wire hand wheel actuator. This assembly utilises a similar dual motor drive system that comprises first and second motors, each having an output driving a respective output gear. Each output gear drives a first gear which is connected to and configured to rotate a shaft of the steering wheel to provide a sensation of road feel to the driver. The dual motor drive system is used to reduce gear rattle by driving both motors at the same time to apply opposing torques to the steering column. Having two motors also provides for some redundancy in the system.

The electrical losses dissipated by motors and some of the associated control electronics are approximately proportional to the square of the motor current which is, in turn, approximately proportional to the motor torque. These losses are dissipated in the motor and the control electronics and heat the components up. The motor and electronics can only operate for certain durations at high temperatures before derating their output (to protect against over-temperature).

Similarly, the stress on some mechanical parts is proportional to the torque applied by the motor. High stress events on the mechanical parts typically occur when at least one motor is running at or close to maximum output torque.

In a typical handwheel actuator (HWA) assembly having two motors, when the total torque demand is below a pre-determined threshold the motors will be working against each other. In this way, a first motor can provide a net torque in a direction opposing the turning of the steering wheel to improve "road feel" for a driver and a second motor provides an offset torque to prevent backlash or rattle of the steering column.

The motor providing the greater torque will provide an increasing torque up to the maximum output torque of the motor. As such, within a first net torque range one motor will provide a constant offset torque whilst the other motor will provide an opposing torque up to and including the maximum output torque of that motor.

In the event that a motor is providing a maximum output torque of that motor but the total torque demand increases, the other motor will cross over from providing an opposing offset torque to providing a torque in the same direction. In this way, above a pre-determined threshold total torque demand both motors will be working together. The output torque of the first motor will remain at 100% of the output torque whilst the output from the second motor will vary, up to 100%, to meet the total torque demand.

As such, for a typical HWA assembly having two motors, one motor will be running at 100% of its maximum output torque for approximately the highest 50% total torque demand.

FIG. 6A shows a typical torque allocation for a conventional dual motor drive assembly. As shown, the torque allocation increases one motor torque to a maximum output when the combined total torque output is approximately half of the maximum. To increase the total torque from this point, additional torque is allocated to the other motor to provide a cooperating torque output.

The present disclosure seeks to ameliorate the problems associated with conventional motor assemblies.

In accordance with an exemplary arrangement of the present disclosure, a dual motor drive assembly comprises:

- a housing;
- a shaft rotatably mounted with respect to the housing;
- a first gear connected to and configured to rotate with the shaft;
- first and second motors, each having an output driving a respective output gear, the output gears being engaged with the first gear;
- a controller for allocating torque demands to each of the first and second motors;
- wherein a threshold torque demand is assigned to each motor, the threshold torque demand being lower than the maximum torque output of the motor, wherein when the allocated torque demand to each motor is less than the threshold torque demand for each motor respectively, the motors are allocated torques in opposing directions, and wherein when the allocated torque demand to one motor reaches or exceeds the threshold torque demand, the other motor switches torque direction such that both motors have the same torque direction.

Advantageously, by assigning a threshold torque demand to each motor that is lower than the maximum torque output of each motor respectively, both motors will work together before either motor reaches 100% of its maximum output torque. In this way, higher total torque demands can be met without having either motor running at 100% of its maximum output torque.

As such, an increased range of total torque demands can be provided by the combined outputs of the motors without having a motor running at 100% of its maximum output. In this way, less time is spent with either motor running at 100% and therefore electrical losses are reduced, the number of high stress events are reduced and the risk of overheating is reduced.

When a motor reaches the threshold torque demand and the other motor switches torque direction such that both motors have the same torque direction, both motors may have the same torque direction for a constant or increase total torque demand. In this way, when both motors have the same torque direction the individual torque demands allocated to each motor may comprise any suitable value to maintain or increase the total torque provided by the motors.

The threshold torque demand assigned to each motor may be fixed or variable.

When the threshold torque demand assigned to each motor is variable, the threshold torque demand assigned may be varied based on any one or more suitable operating conditions such as measured or estimated temperatures within the assembly or any other motor or assembly parameters. For torque demands above the threshold of a first motor, the torque demand assigned to each motor may be modified in any suitable way.

The threshold torque demand may be fixed at a pre-determined torque demand value. The threshold torque demand may comprise a fixed pre-determined torque demand range wherein the threshold torque value may be variable within the pre-determined range.

In one example, the torque demand allocated to the first motor may be maintained at the threshold torque value whilst the torque demand allocated to the second motor may be increased in order to provide a greater total torque. The torque demands allocated to the second motor may be increased to match the torque demand allocated to the first motor. When the torque demands allocated to both motors is equal, the torque demand of both motors may be increased equally to provide an increased total torque demand.

In another example, the torque demand allocated to the first motor may increase from the threshold torque value whilst the torque demand allocated to the second motor may also be increased in order to provide a greater total torque. The torque demands allocated to the second motor may be increased at a greater rate than the first motor until the torque demand of the second motor matches the torque demand allocated to the first motor. When the torque demands allocated to both motors is equal, the torque demand of both motors may be increased equally to provide an increased total torque demand.

In another example, the torque demand allocated to the first motor may decrease from the threshold torque value whilst the torque demand allocated to the second motor may be increased at a greater rate in order to provide a greater total torque. The torque demands allocated to the second motor may be increased to match the torque demand allocated to the first motor. When the torque demands allocated to both motors is equal, the torque demand of both motors may be increased equally to provide an increased total torque demand.

The dual motor drive assembly may further comprise:

a controller for determining a target friction;

a controller for calculating a mechanical friction;

wherein the target friction and mechanical friction are compared, and wherein the mechanical friction is modified to meet the target friction by varying the difference between the two motor torque demands when the two motor torques are in opposing directions.

A net torque demand or total torque demand may be defined as an instantaneous sum of the two motor torque demands. When the two motor torques are in opposing directions, the torque demand of the motors may be adjusted such that the torque demand of each motor is increased or decreased by an equal and opposite magnitude. In this way, the mechanical friction may be modified to meet the target friction by varying the difference between the two motor torque demands whilst maintaining a constant net torque value. As such, for each net torque value where two motor torques are in opposing directions, the mechanical friction may be modified to meet the target friction.

The controller for calculating a mechanical friction may use any one or more of: the allocated torque demands to each of the first and second motors; the motor current demands of the first and second motors. The controller for calculating a mechanical friction may be described as a controller for calculating a magnitude of mechanical friction acting on the shaft of an HWA assembly.

The target friction may comprise a mechanical friction component and a synthetic friction component. Synthetic friction may be described as the net torque applied to the worm wheel gear in a direction opposing the turning of the shaft by a driver of the vehicle.

At higher steering torques, the synthetic component can be more easily modified to meet the target friction, but not at lower steering torques. Therefore, the claimed disclosure may advantageously provide an assembly capable of meeting a target friction at lower total steering torques by modifying the mechanical torque, i.e. modifying the mechanical torque when the two motor torques are in opposing directions.

If the mechanical friction is greater than the target friction, then the synthetic friction is adjusted to oppose at least a portion of the mechanical friction such that a total friction is reduced. If the mechanical friction is less than the target friction, then the synthetic friction is adjusted such that the total friction is increased. This is particularly useful at higher net torque values when the motor torques are acting in the same direction on the steering column shaft.

The dual motor drive assembly may form part of a handwheel actuator assembly for a vehicle, where the shaft includes a fixing part whereby it can be fixed to a steering wheel or yoke.

In an exemplary arrangement, the first gear comprises a worm wheel gear and each of the output gears comprises a worm screw.

The rotational axes of the two worm screws may be substantially parallel or they may be inclined with respect to each other. The rotational axes of the two worm screws may extend perpendicularly to the rotational axis of the first gear.

This arrangement may advantageously reduce the overall size of the assembly, which facilitates fitting it within a relatively limited volume within the vehicle.

The motors may be located within the housing.

The motors may be substantially identical apart from their orientation. The output gears may also be substantially identical so that the torque multiplication from the motors to the shaft are the same.

The torque demand to the controller is separated into a torque feedback part and a friction part.

A synthetic torque demand is calculated and subtracted from the torque feedback part to give a modified torque demand.

The modified torque demand and friction part are used to calculate the two motor torque demands according to an allocation scheme, such as shown in the Figures. The allocation calculation limits the friction demand according to the limits of the selected allocation scheme.

The two motor torque demands are converted to motor current demands and passed to the motor controllers.

The motor torque demands are used to calculate or estimate the mechanical friction magnitude.

The difference between the mechanical friction magnitude and friction part of the total torque demand is used to calculate the demanded synthetic friction.

In another exemplary arrangement, the disclosure provides a method of operating a dual motor drive assembly, the dual motor drive assembly comprising:

a housing; a shaft rotatably mounted with respect to the housing; a first gear connected to and configured to rotate with the shaft; first and second motors, each having an output driving a respective output gear, the output gears being engaged with the first gear; and wherein the method comprises the steps:

allocating torque demands to each of the first and second motors;

assigning a threshold torque demand to each motor, the threshold torque demand being lower than the maximum torque output of the motor, wherein when the allocated torque demand to each motor is less than the threshold torque demand for each motor respectively, the motors are allocated torques in opposing directions, and wherein when the allocated torque demand to one motor reaches or exceeds the threshold torque demand, the other motor switches torque direction such that both motors have the same torque direction.

The threshold torque demand may be assigned depending on one or more operating conditions. The threshold torque demand may be assigned depending on one or more measured or calculated parameters, such as temperature for example.

The threshold torque demands may be a fixed torque value.

The threshold torque demand may be fixed, or predetermined, range.

The threshold torque demand may be variable.

In another exemplary arrangement, the disclosure provides a method of modifying the mechanical friction in a dual motor drive assembly, the dual motor drive assembly comprising:

a housing; a shaft rotatably mounted with respect to the housing; a first gear connected to and configured to rotate with the shaft; first and second motors, each having an output driving a respective output gear, the output gears being engaged with the first gear; and wherein the method comprises the steps:

allocating torque demands to each of the first and second motors;

determining a target friction;

calculating a mechanical friction;

comparing the target friction and mechanical friction; and when the two motor torques are in opposing directions, modifying the mechanical friction to meet the target friction by varying the difference between the two motor torque demands.

Allocating torque demands to each of the first and second motors may include: separating a total torque demand to the controller into a torque feedback part and a friction part;

calculating a synthetic friction demand and subtracting this from the torque feedback part to give a modified torque demand; and calculating a motor torque demand for each of a first and second motor using the modified torque demand and the friction part, according to an allocation scheme.

The method may further include:

converting the motor torque demand for the first motor to a first motor current demand and passing the first motor current demand to a first motor controller;

converting the motor torque demand for the second motor to a second motor current demand and passing the second motor current demand to a second motor controller.

The method may include calculating the mechanical friction includes measuring a difference between the mechanical friction magnitude and the friction part and calculating the demanded synthetic friction using the difference.

Any features disclosed in relation to any aspect of the disclosure may equally be applied to any other aspect of the disclosure.

DETAILED DESCRIPTION

Figure 1:
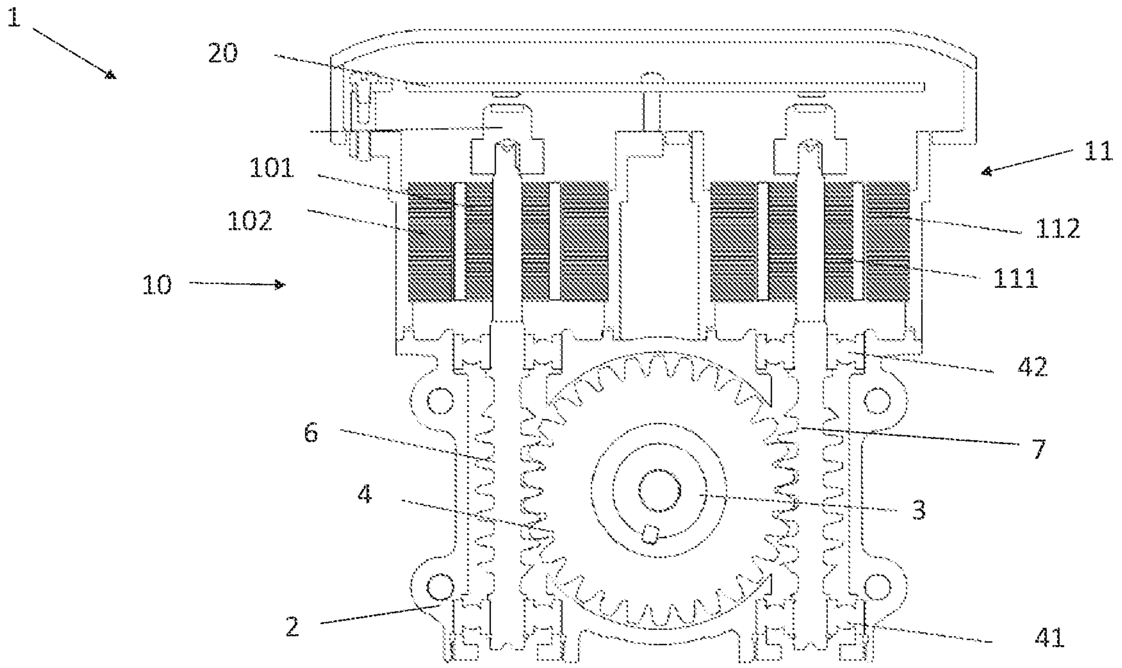
FIG. 1 shows an exemplary arrangement of a dual motor drive assembly according to an exemplary arrangement of the disclosure.

FIG. 1 shows a dual motor drive assembly, suitable for use in a handwheel actuator (HWA) assembly of a vehicle, according to an exemplary arrangement of the disclosure. The drive assembly 1 includes a first motor 10 with a rotor 101 and stator 102, and a second motor 11 with a rotor 111 and stator 112, the first motor 10 being connected to a first worm gear 6 and the second motor 11 being connected to a second worm gear 7. Each worm gear 6, 7 comprises a threaded shaft arranged to engage with a gear wheel 4 connected to a steering column shaft 3 such that torque may be transferred from the worm gears 6, 7 to the gear wheel 4 connected to the steering column shaft 3. The gear wheel 4 is operatively connected to a driver's steering wheel (not shown) via the steering column shaft 3. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm gears 6, 7 and the wheel gear 4 together form a dual motor electrical assembly.

Each of the two motors 10, 11 are controlled by an electronic control unit (ECU) 20. The ECU 20 controls the level of current applied to the windings and hence the level of torque that is produced by each motor 10, 11.

In this example, the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present exemplary arrangement) ameliorates the problems associated with use of a single motor. In this arrangement, both motors 10, 11 are controlled by the ECU 20 to provide torque feedback to the steering column and to ensure that the worm shafts 6, 7 of both motors 10, 11 are continuously in contact with the gear wheel 4, in order to minimise rattle. The use of two motors 10, 11 in this way also allows active management of the friction and thereby the feedback force to the driver.

As shown in FIG. 1, the motors 10, 11 are received in and secured to a transversely extending two-part extension of a housing 2. The worm shaft 6, 7 of each motor is supported relative to the housing by two sets of bearings. A first set of bearings 41 supports a first end of each worm shaft 6, 7 distal their respective motor 10, 11 while a second set of bearings 42 supports a second end of each worm shaft 6, 7 proximal their respective motor 10, 11.

Figure 2:
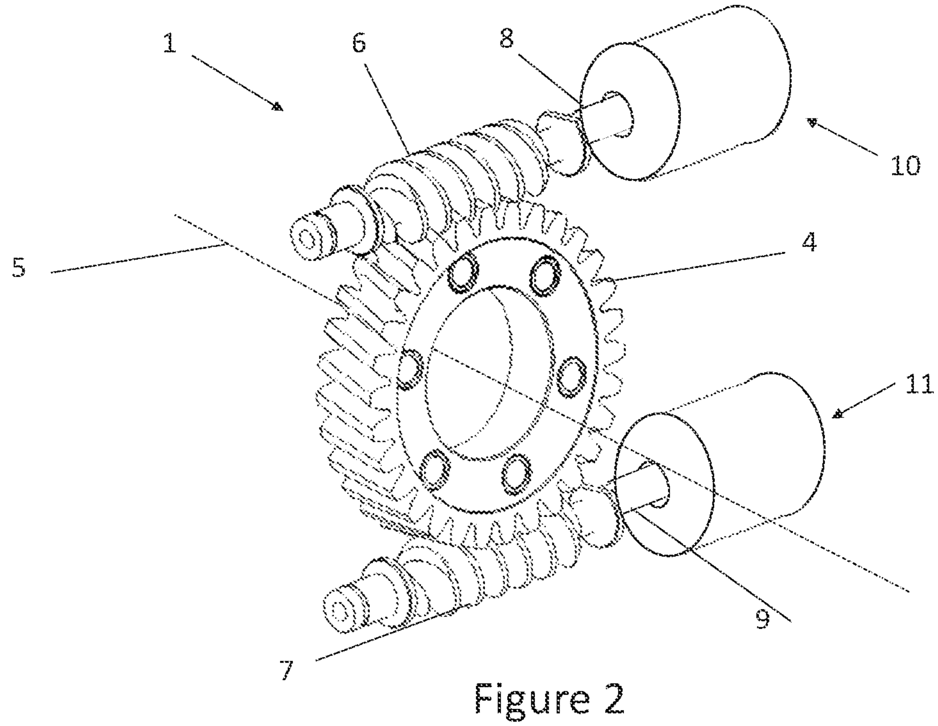
FIG. 2 shows a part of the dual motor drive apparatus of FIG. 1 with the gearbox housing removed to better show the gears and the motor connection to the gears.

FIG. 2 shows an axis of rotation of the shaft is marked using a dashed line 5, extending perpendicularly through the gear wheel 4. The periphery of the gear wheel 4 is formed as a worm gear which meshes with each of two identical worm screws 6, 7 located on opposite sides of the longitudinal axis 5 of the shaft 3. Each worm screw 6, 7 is connected to the output shaft 8, 9 of a respective electric motor 10, 11.

The axes of the output shafts 8, 9 of the two motors 10, 11 are arranged perpendicularly to the rotational axis of the shaft 3 and the axes of the two motors may also be inclined with respect to each other, to reduce the overall size of the assembly.

The motors 10, 11 are controlled by the electronic control unit (ECU) 20 such that at low levels of input torque applied to the shaft 3 by the steering wheel, the motors 10, 11 act in opposite directions on the gear wheel 4 to eliminate backlash. At higher levels of input torque applied to the shaft 3 by the steering wheel, the motors 10, 11 act in the same direction on the gear wheel 4 to assist in rotation of the shaft 3. Here, a motor 10, 11 acting in 'a direction' is used indicate the direction of torque applied by a motor 10, 11 to the gear wheel 4.

The use of two separate motors 10, 11 which can be controlled in a first operational mode to apply torque in opposite directions to the gear wheel 4 eliminates the need to control backlash with precision components. In addition, the use of two separate motors 10, 11 which can be controlled in a second operational mode to apply torque in the same direction to the gear wheel 4 allows the motors 10, 11 and gear components 4, 6, 7 to be specified at half the rating of the required total system torque, thereby reducing the size and cost of the drive assembly 1.

In the exemplary arrangement shown in FIGS. 1 and 2, the worm shafts 6, 7 engage diametrically opposed portions of a gear wheel 4. The threads of the worm shafts 6, 7 each have the same sense, i.e., in this example, they are both left-handed screw threads. The motors 10, 11 are configured such that they lie on the same side of the gear wheel 4 (both motors 10, 11 lie on one side of a virtual plane perpendicular to axes of the worm shafts 6, 7 and passing through the centre point of the gear wheel 4). Considering as an example the perspective shown in FIG. 2, driving both motors 10, 11 clockwise would apply torque in opposite directions to the gear wheel 4, with motor 10 applying a clockwise torque to gear wheel 4 and motor 11 applying an opposing anticlockwise torque to gear wheel 4.

Figure 3:
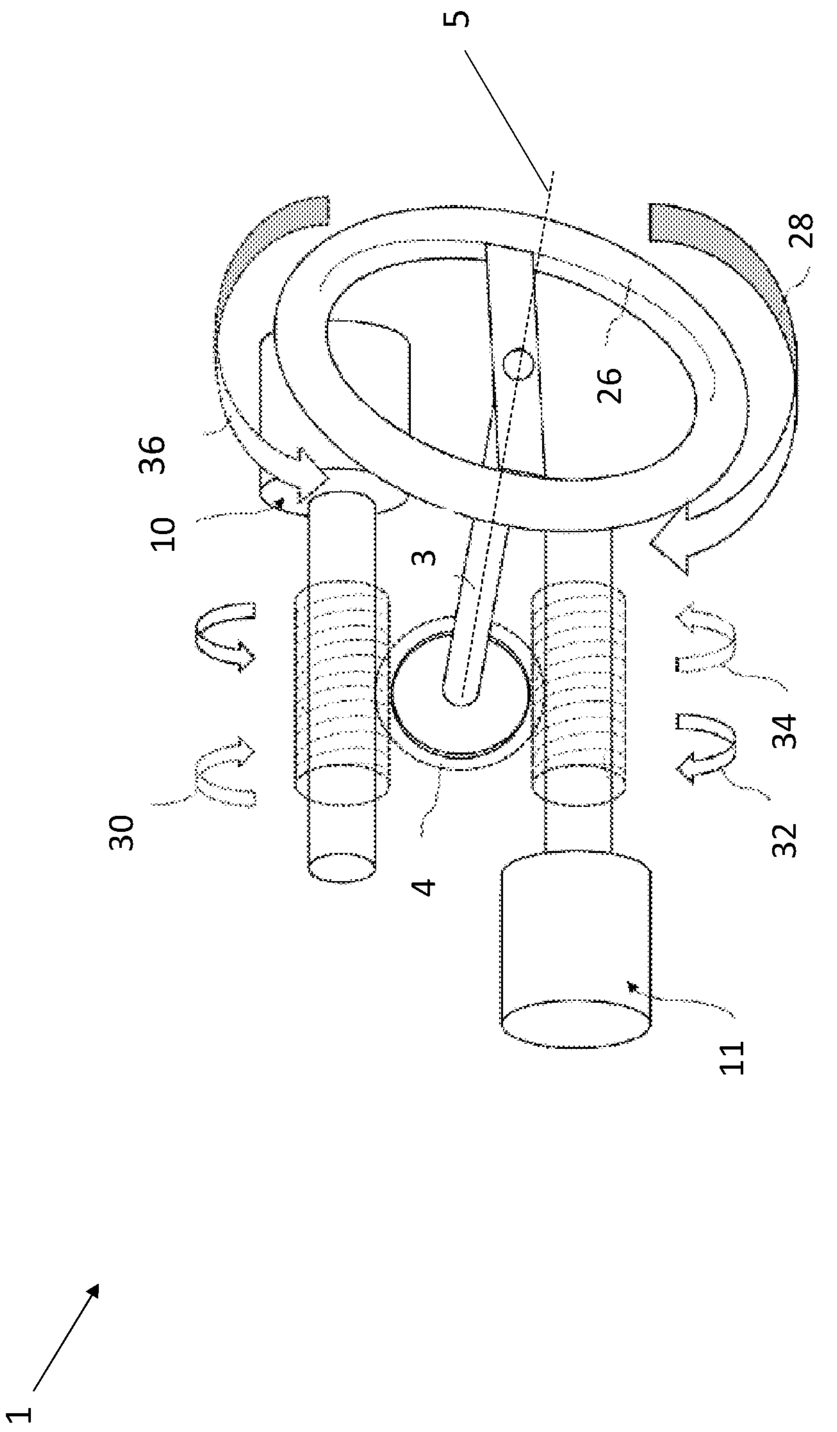
FIG. 3 shows another exemplary arrangement of a dual motor drive assembly according to an exemplary arrangement of the disclosure.

FIG. 3 shows another exemplary arrangement of a dual motor drive assembly, substantially similar to the exemplary arrangement shown in FIGS. 1 and 2 but with different motor positioning.

FIG. 3 shows another exemplary arrangement of a dual motor drive assembly 1 according to exemplary arrangement of the disclosure. This exemplary arrangement is substantially similar to the exemplary arrangement shown in FIGS. 1 and 2 with the only difference being the positioning of the motors 10, 11. Components and functional units which in terms of function and/or construction are equivalent or identical to those of the preceding exemplary arrangement are provided with the same reference signs and are not separately described. The explanations pertaining to FIG. 1 and FIG. 2 therefore apply in analogous manner to FIG. 3 with the exception of the positioning of the two motors 10, 11.

In FIG. 3 the worm shafts 6, 7 engage diametrically opposed portions of a gear wheel 4 and threads of the worm shafts 6, 7 each have the same sense, i.e., in this example they are both right-handed screw threads. The motors 10, 11 are configured such that they lie on opposing sides of the gear wheel 4 (motor 10 lies on one side of a virtual plane perpendicular to axes of the worm shafts 6, 7 and passing through the centre point of the gear wheel 4 while motor 11 lies on the other side of this virtual plane).

Application of torque by a driver in a clockwise direction indicated by solid arrow 28 results in rotation of the steering wheel 26 and the steering column shaft 3 about the dashed line 5. This rotation is detected by a rotation sensor (not shown). The first motor 10 is then controlled by the ECU 20 to apply torque as indicated by dashed arrow 30. In a first operational mode, the second motor 11 is actuated by the ECU 20 to apply an offset torque 32 in the opposite direction to the torque 30 of the first motor 10 to reduce gear rattling. In another exemplary arrangement, in a second operational mode, the second motor 11 is actuated by the ECU 20 to apply a torque 34 in the same direction to the torque 30 of the first motor 10 to increase the feedback torque to the steering column shaft 3. Whether the drive assembly 1 is operated in the first operational mode or in the second operational mode depends on the circumstances, as will be explained below.

The net result of the torques 30, 32, 34 applied by the first and second motors 10, 11 results in an application of a feedback torque to the steering column shaft 3 and steering wheel 26, as indicated by a dashed arrow 36, to provide a sensation of road feel to the driver. In this way, the "rattle" produced between the worm shafts 6, 7 and the gear wheel 4 can be eliminated or significantly reduced.

Figure 4:
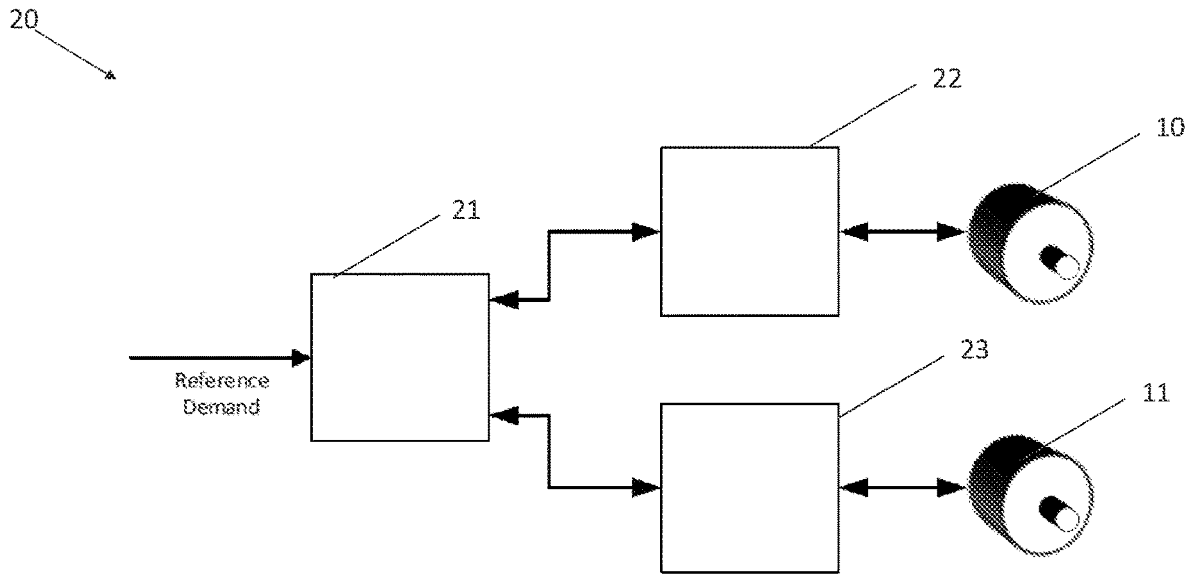
FIG. 4 shows a general arrangement of an electronic control unit which controls the two motors of a dual motor drive assembly according to an exemplary arrangement of the disclosure.

FIG. 4 reveals part of an HWA assembly (80) showing a general arrangement of an electronic control unit (ECU) 20 which controls each of the two motors 10, 11. The ECU 20 may include a hand wheel actuator (HWA) control system 21 as well as a first and second motor controller 22, 23 which control the first and second motors 10, 11 respectively. A reference demand signal is input to the HWA control system 21 which allocates torque demands to each of the first and second motors 10, 11. These motor torque demands are converted to motor current demands and transmitted to using a dashed line 5 the first and second motor controllers 22, 23. Each motor 10, 11 provides operating feedback to their respective motor controller 22, 23. The HWA control system 21 is configured to calculate the magnitude of mechanical friction using the motor torque demands. In another exemplary arrangement, the HWA control system 21 may be implemented by a separate ECU to the first and second motor controller 22, 23.

Figure 5:
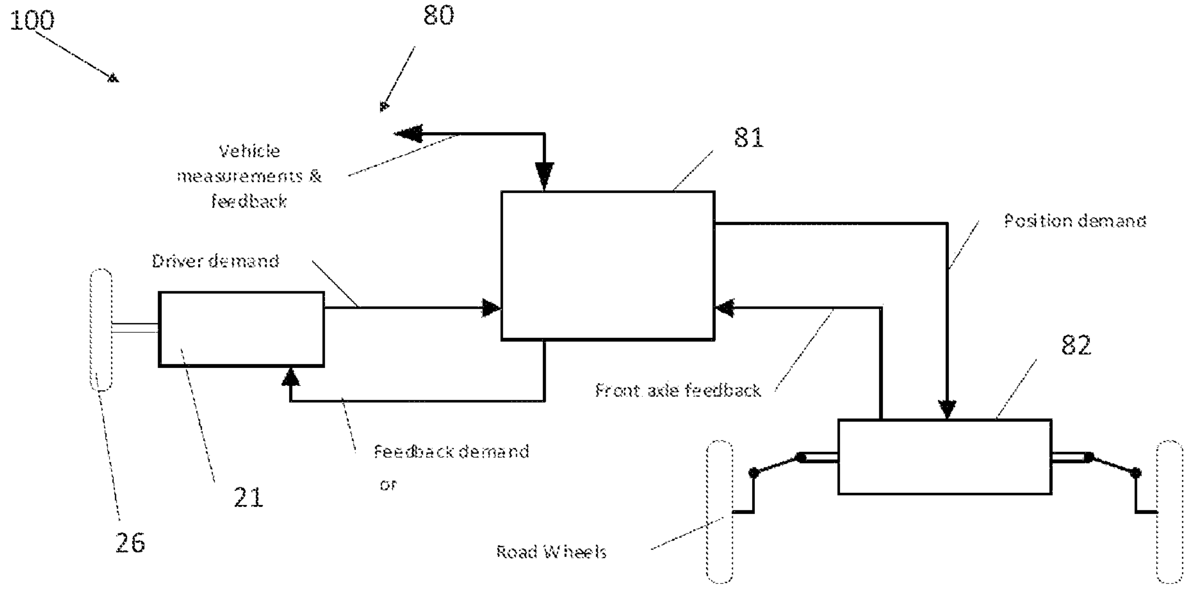
FIG. 5 shows a layout of a Steer-by-Wire system including a dual motor drive assembly according to an exemplary arrangement of the disclosure.

FIG. 5 shows an overall layout of a Steer-by-Wire system 100 for a vehicle including handwheel actuator (HWA) assembly 80 using a dual motor drive assembly 1 according to exemplary arrangement of the disclosure. The HWA assembly 80 supports the driver's steering wheel 26 and measures the driver demand which is usually the steering angle. A steering controller 81 converts the driver demand into a position demand that is sent to a front axle actuator (FAA) 82. The FAA 82 controls the steering angle of the roadwheels to achieve the position demand. The FAA 82 can feedback operating states and measurements to the steering controller 81.

The steering controller 81 combines the FAA 82 feedback with other information measured in the vehicle, such as lateral acceleration, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 5 shows the steering controller 81 as physically separate to both the HWA controller 21 and the FAA 82. In another exemplary arrangement, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. In another exemplary arrangement, control functions ascribed to the HWA controller 21 and FAA 82 may be partially or totally implemented in the steering controller 81.

Figure 6A:
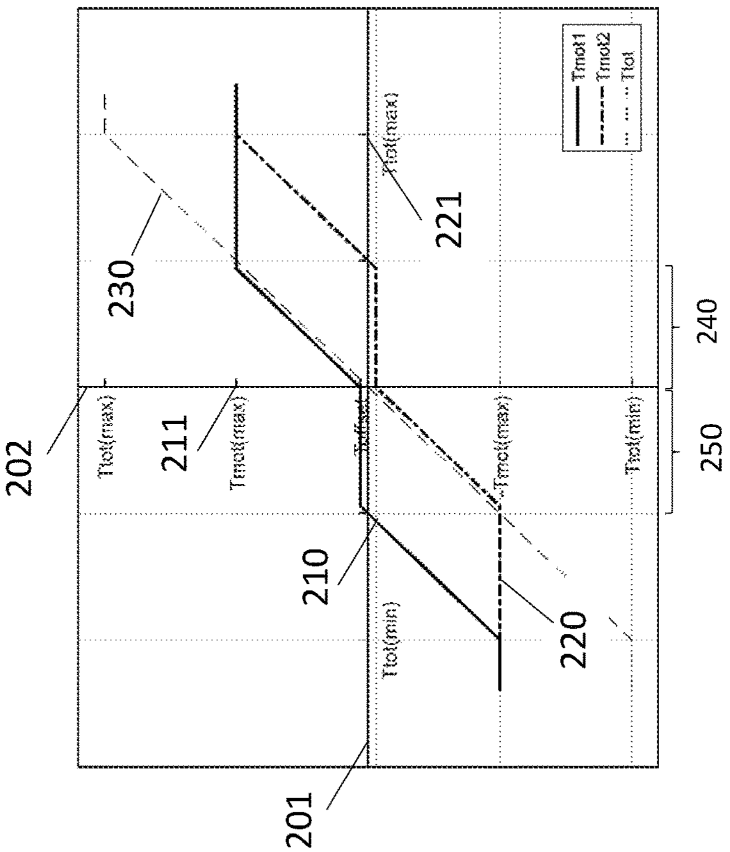
FIG. 6A shows a relationship between the feedback torque demanded and the feedback torque applied for a conventional dual motor drive assembly.

The relationship between the total torque demanded to provide feedback to the driver (x-axis) 201 and the feedback torque applied (y-axis) 202 for a conventional dual motor drive assembly is shown in FIG. 6A.

Solid line 210 represents the torque applied by the first motor 10 while dashed line 220 represents the torque applied by the second motor 11. The net torque applied by the two motors is represented by dashed line 230. In a first torque range 240 where torque is positive, the first motor 10 applies a torque shown by solid line 210 to provide feedback to the steering column shaft 3 and steering wheel 26, while the second motor 11 applies a smaller magnitude torque known as an "offset torque" in the opposite direction to provide an "active" lock to eliminate or reduce transmission rattle. The roles of the motors change depending in which direction the driver is steering. In a second torque range 250 where the torque is negative, the second motor 110 applies a feedback torque 220 to the steering column shaft 3 and the first motor 10 applies a smaller magnitude "offset" torque 210 in the opposite direction.

Figure 6B:
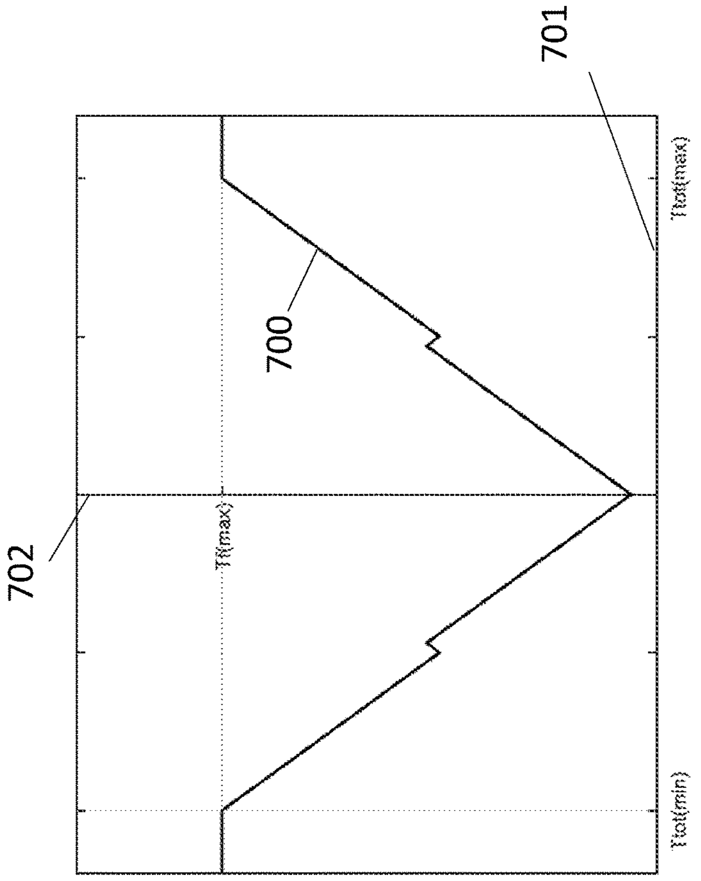
FIG. 6B shows the resultant relationship between the net torque applied in FIG. 6A and a mechanical friction torque generated by an interaction of sliding surfaces in an HWA assembly.

The resultant relationship between the net torque applied by the two motors 10, 11 (x-axis 701) and mechanical friction torque generated by the interaction of sliding surfaces in an HWA assembly 80 (y-axis 702), such as quasi-static Coulomb friction, is shown in FIG. 6B by solid line 700.

It can be seen in FIG. 6A, that as the total torque demanded increases from zero the first motor 10 provides an increasing applied torque 210 until a maximum output 211 for the first motor 10 is reached. As the total torque demanded further increases, the applied torque 220 provided by the second motor 11 increases such that both motors 10, 11 are applying a torque in the same direction (e.g., positive in the top right quadrant) to the first gear wheel 4. The net torque 230 applied by the two motors 10, 11 can be seen to increase at a constant rate from zero until a maximum output 221 for the second motor 11 is reached, at which point both the first and second motors have reached their maximum output torques 211, 221 and the net torque 230 plateaus.

As discussed previously, such an allocation of torques has several disadvantages, resulting in a large number of high stress events are increasing the risk of overheating. The present disclosure seeks to ameliorate these problems using novel torque allocation schemes.

This is shown in FIGS. 7 to 9B which disclose example ways in which torque may be allocated to the two motors 10, 11 to better utilise the torque outputs of each of the two motors 10, 11.

Figure 7:
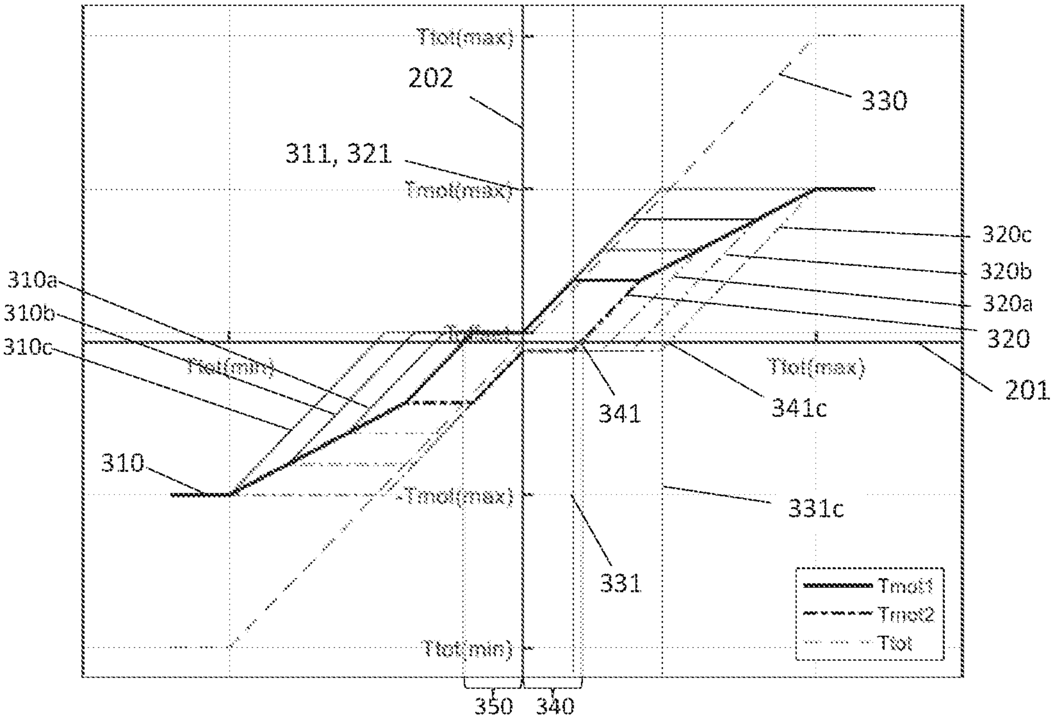
FIG. 7 shows an example relationship between a total torque demanded and the motor torques of the first and second motors.

FIG. 7 shows a relationship between a feedback torque demanded a feedback torque applied for a dual motor drive assembly according to an exemplary arrangement of the disclosure.

Solid line 310 represents the torque applied by the first motor 10 while dashed line 320 represents the torque applied by the second motor 11. The net torque applied by the two motors is represented by dashed line 330. In a first torque range 340 where total torque is positive, the first motor 10 applies a torque shown by solid line 310 to provide feedback to the steering column shaft 3 and steering wheel 26, while the second motor 11 applies a smaller magnitude torque, or an offset torque, in the opposite direction to provide an "active" lock to eliminate or reduce transmission rattle. The roles of the motors 10, 11 change depending in which direction the driver is steering. In a second torque range 350 where torque is negative, the second motor 11 applies a feedback torque 320 to the steering column shaft 3 and the first motor 10 applies a smaller magnitude "offset" torque 310 in the opposite direction.

FIG. 7 shows a modified allocation compared to a typical allocation scheme shown by FIG. 6. The modified torque demand allocation scheme minimises the time spent by a motor torque 310, 320 at a maximum output to reduce the motor heating and to reduce the mechanical stress on the dual motor drive assembly.

As the total torque demanded increases from zero, the first motor 10 provides an increasing applied torque 310 until a threshold torque demand 331 is reached. The threshold torque demand 331 is less than the maximum output 311 for the first motor 10. In this example, the applied torque 310 of the first motor 10 plateaus at torque demands equal and exceeding the threshold torque demand 331. It will be understood that the threshold torque shown is simply an example of a threshold torque where the threshold torque is below the maximum output torque of the motor.

As the total torque demanded increases from zero, the second motor 11 provides a constant applied torque 320 in the opposite direction (negative in FIG. 7) to the applied torque 310 of the first motor at this total torque demand, until the threshold torque demand 331 is reached. In this example, the applied torque 320 of the second motor 11 increases at a constant rate with respect to the total demanded torque at torque demands equal and exceeding the threshold torque demand 331 until a maximum applied torque 321 is reached. At a cross-over point 341 the applied torque 320 provided by the second motor 11 has increased such that both motors 10, 11 are now applying a torque in the same direction (e.g., positive, in the top right quadrant) to the first gear wheel 4.

The net torque 330 applied by the two motors 10, 11 can be seen to increase at a constant rate from zero until a maximum output 321 for the second motor 11 is reached, at which point both the first and second motors have reached their maximum output torques 311, 321 and the net torque 330 plateaus.

In this example, the maximum torque 321 of the second motor 11 is equal to the maximum torque 311 of the first motor 10 however, it is within the scope of the disclosure that the maximum applied torque 311 of the first motor 10 be greater than or less than the maximum applied torque 321 of the second motor 11.

Advantageously, by assigning a threshold torque demand 331 lower than the maximum torque output 311, 321 of each motor 10, 11, both motors 10, 11 will work together before either motor 10, 11 reaches its maximum output torque 311, 321. In this way, higher total torque demands can be met without having either of the two motors running at its maximum output torque 311, 321.

As such, an increased range of total torque demands can be provided by the combined outputs of the motors 310, 320 without having either the first or second motor 10, 11 running a its maximum output 311, 321. In this way, less time during operation of the dual motor assembly is spent with either motor 10, 11 running at its maximum output torque 311, 321 and therefore electrical losses are reduced, the number of high stress events are reduced and the risk of overheating is reduced.

The threshold torque demand 331 assigned to each motor may be variable such that the threshold torque demand 331 may be varied based on any one or more suitable operating conditions such as measured or estimated temperatures within the assembly.

This may have the effect of altering the cross-over point 341 at which the applied torques 310, 320 of both the first and second motor switch to act in the same direction i.e., both positive to the right of point 341 in FIG. 7.

Three additional profiles representing the relationship between feedback torque demanded and feedback torque applied for the dual motor drive assembly with varied threshold torque demands are also shown in FIG. 7. Solid lines 310*a*, 310*b* and 310*c* represents the torque applied by the first motor 10 while dashed lines 320*a*, 320*b*, 320*c* each respectively represent the corresponding torque applied by the second motor 11. This modification can be seen to vary the crossover point 341. For example, a threshold torque demand 331*c* (greater than threshold torque demand 330) results in a crossover point 341*c*, for corresponding applied torques 310*c* and 320*c*, displaced to higher total torque demands (to the right in of crossover point 341 in FIG. 7).

Figure 8:
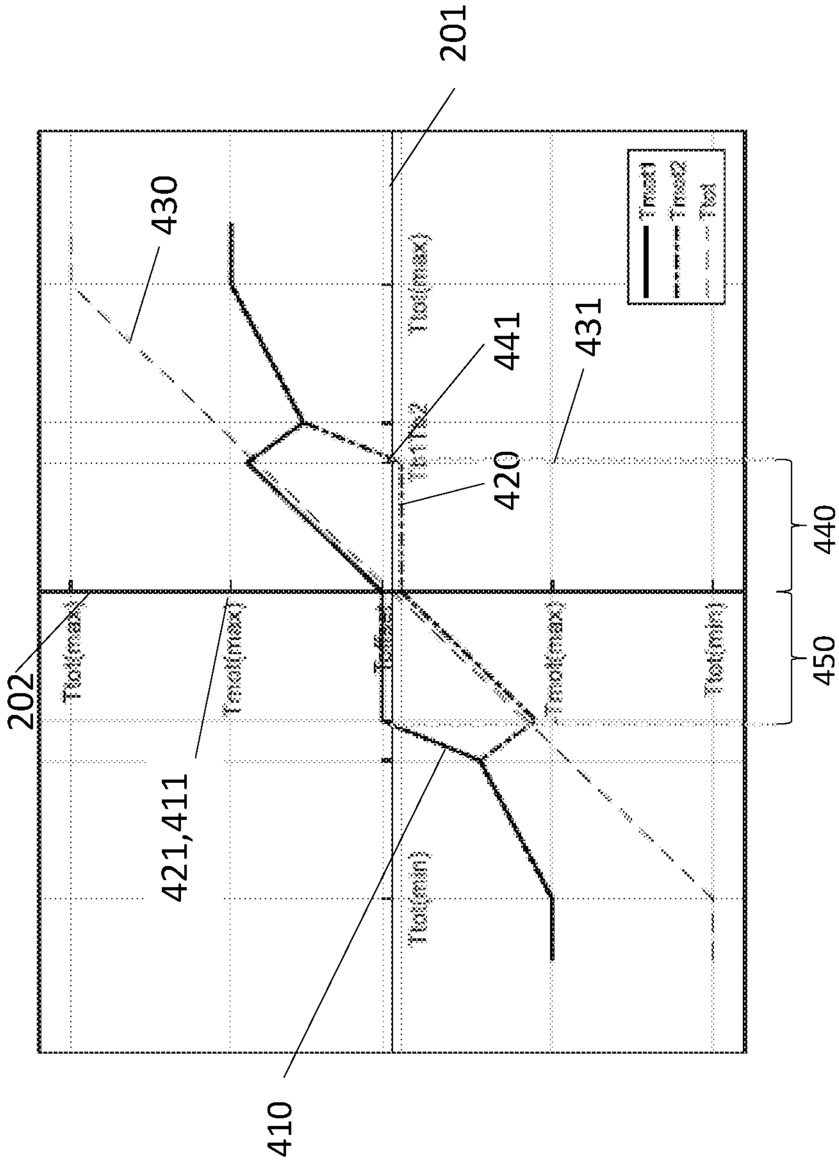
FIG. 8 shows another example relationship between a total torque demanded and the motor torques of the first and second motors.

FIG. 8 shows a relationship between a feedback torque demanded and a feedback torque applied for a dual motor drive assembly 1.

Solid line 410 represents the torque applied by the first motor 10 while dashed line 420 represents the torque applied by the second motor 11. In a first torque range 440 where torque is positive, the first motor 10 applies a torque shown by solid line 410 to provide feedback to the steering column shaft 3 and steering wheel 26, while the second motor 11 applies a smaller magnitude torque known as an "offset torque" in the opposite direction to provide an "active" lock to eliminate or reduce transmission rattle. The roles of the motors 10, 11 change depending in which direction the driver is steering. In a second torque range 450 where torque is negative, the second motor 11 applies a feedback torque 420 to the steering column shaft 3 and the first motor 10 applies a smaller magnitude "offset" torque 410 in the opposite direction.

As the total torque demanded increases from zero, the first motor 10 provides an increasing applied torque 410 until a threshold torque demand 431 is reached. The threshold torque demand 431 is less than the maximum output 411 for the first motor 10.

In this example shown in FIG. 8, the torque 410 of the first motor 10 decreases at a constant rate from the threshold torque as the total torque increases, and the torque 420 of the second motor increases, until the applied torque 410 of the first motor 10 equals the applied torque 420 of the second motor 11.

At a cross-over point 441 the applied torque 420 provided by the second motor 11 has increased such that both motors 10, 11 are now applying a torque in the same direction (e.g., positive, in the top right quadrant) to the first gear wheel 4.

The net torque 430 applied by the two motors 10, 11 can be seen to increase at a constant rate from zero until a maximum output 421 for the second motor 11 is reached, at which point both the first and second motors have reached their maximum output torques 411, 421 and the net torque 430 plateaus.

Advantageously, by assigning a threshold torque demand 431 is lower than the maximum torque output 411, 421 of each motor 10, 11, both motors 10, 11 will work together before either motor 10, 11 reaches its maximum output torque 411, 421. In this way, total torque demands which exceed the individual maximum torque output 411, 421 of either motor 10, 11, can be met without having either of the two motors 10, 11 running at its maximum output torque 411, 421. This limits the fraction of operation time that either motor 10, 11 is operating at or close to its maximum output torque 411, 421.

As such, an increased range of total torque demands can be provided by the combined outputs of the motors 410, 420 without having either the first or second motor 10, 11 running a its maximum output 411, 421. In this way, less time during operation of the dual motor assembly is spent with either motor 10, 11 running at its maximum output torque 411, 421 and therefore electrical losses are reduced, the number of high stress events are reduced and the risk of overheating is reduced.

The threshold torque demand 431 assigned to each motor may be variable such that the threshold torque demand 431 may be varied based on any one or more suitable operating conditions such as measured or estimated temperatures within the assembly.

This may have the effect of altering the cross-over point 441 at which the applied torques 410, 420 of both the first and second motor switch to act in the same direction i.e., both positive to the right of point 441 in FIG. 8.

In this example, the maximum applied torque 421 of the second motor 11 is equal to the maximum applied torque 411 of the first motor 10 however, it is within the scope of the disclosure that the maximum applied torque 411 of the first motor 10 be greater than or less than the maximum applied torque 421 of the second motor 11.

Figure 9B:
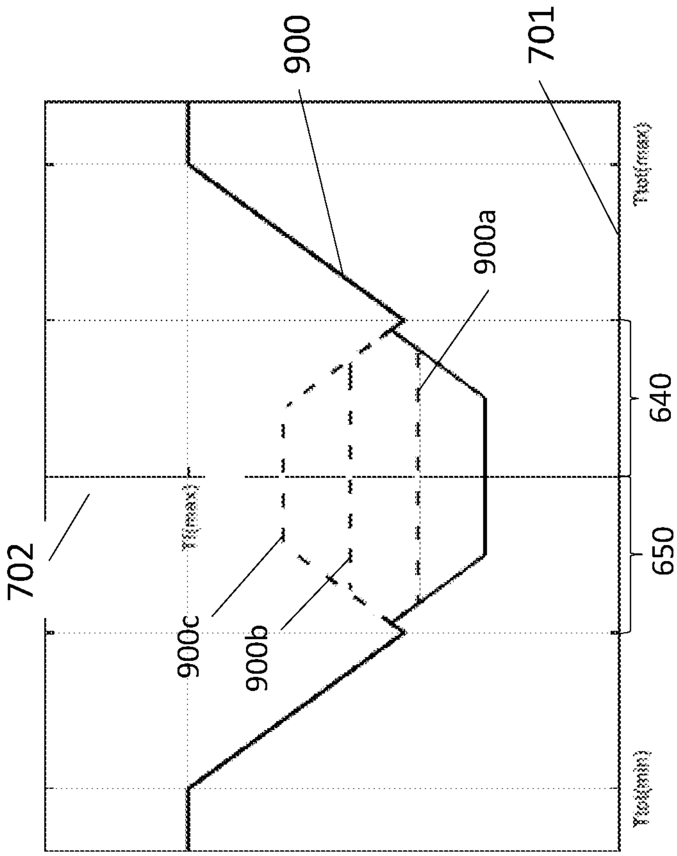
FIG. 9B shows the resultant relationship between the net torque applied in FIG. 9A and a mechanical friction torque generated by an interaction of sliding surfaces in an HWA assembly.
Figure 9A:
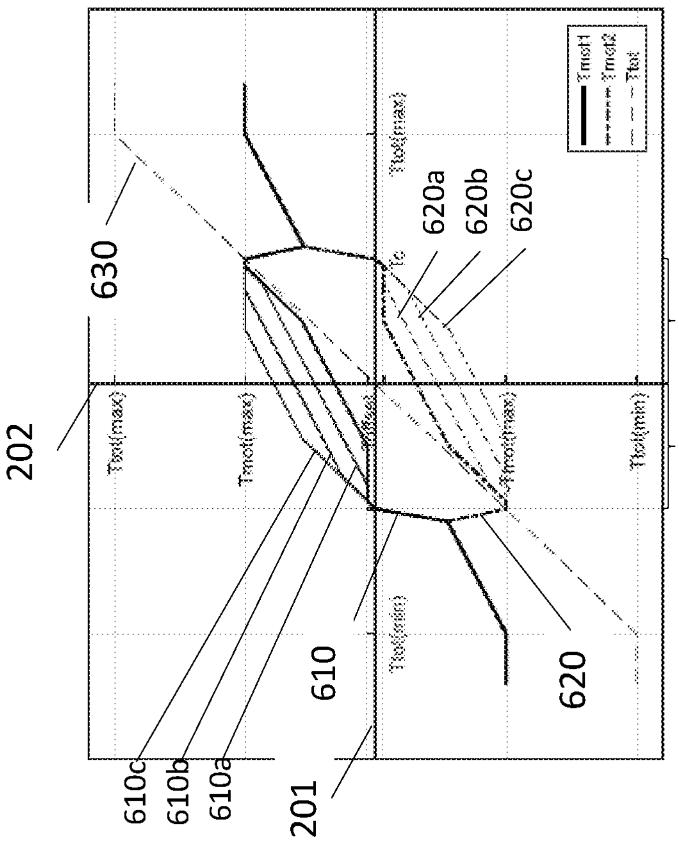
FIG. 9A shows another relationship between a total torque demanded and the motor torques of the first and second motors.

FIG. 9A shows an example motor torque allocation in relation to a total torque demand 630. The motor torques 610, 620 are similar to those shown in FIG. 8. The torque demands 610, 620 vary to those shown in FIG. 8 in the regions 640, 650 where the motor torques are configured such that they are opposing each other. In the regions 640, 650 where the motor torques 610, 620 are opposing each other, possible variations 610*a*, 610*b*, 610*c*, 620*a*, 620*b*, 620*c* are shown.

By varying the magnitude of the opposing torques, different mechanical friction values can be provided. The varying mechanical friction values are shown in FIG. 9B which shows the resultant relationship between the net torque applied by the two motors 10, 11 (x-axis 701) and mechanical friction torque generated by the interaction of sliding surfaces in an HWA assembly 80 (y-axis 702), such as quasi-static Coulomb friction, represented by solid line 900. Where dashed lines 900*a*, 900*b* and 900*c* correspond to motor torques 610*a*, 620*a*; 610*b*, 620*b*; and 610*c*, 620*c* respectively.

The invention claimed is:

1. A dual motor drive assembly comprising:

a housing;

a shaft rotatably mounted with respect to the housing;

a first gear connected to and configured to rotate with the shaft;

first and second motors, each having an output driving a respective output gear, the output gears being engaged with the first gear;

a controller configured to allocate torque demands to each of the first and second motors;

wherein a threshold torque demand is assigned to each motor, the threshold torque demand being lower than a respective maximum torque output of thethat motor, wherein when the allocated torque demand to each motor is less than the threshold torque demand for each motor respectively, the motors are allocated torques in opposing directions, and wherein when the allocated torque demand to one motor reaches or exceeds the threshold torque demand, the other motor switches torque direction such that both motors have the same torque direction.

2. A dual motor drive assembly according to claim 1 wherein when both motors have the same torque direction, both motors continue to have the same torque direction for a constant or increase total torque demand.

3. A dual motor drive assembly according to claim 1 wherein the threshold torque demand assigned to each motor is fixed or variable.

4. A dual motor drive assembly according to claim 3 wherein when the threshold torque demand is varied based on one or more operating conditions, including measured or estimated temperatures within the assembly.

5. A dual motor drive assembly according to claim 3 wherein the threshold torque demand is fixed at a predetermined torque demand value.

6. A dual motor drive assembly according to claim 1 wherein the torque demand allocated to the first motor is maintained at the threshold torque value whilst the torque demand allocated to the second motor is increased in order to provide a greater total torque.

7. A dual motor drive assembly according to claim 6 wherein the torque demands allocated to the second motor may be increased to match the torque demand allocated to the first motor.

8. A dual motor drive assembly according to claim 1 wherein the torque demand allocated to the first motor is increased from the threshold torque value whilst the torque demand allocated to the second motor is increased in order to provide a greater total torque.

9. A dual motor drive assembly according to claim 8 wherein the torque demands allocated to the second motor are increased at a greater rate than the first motor until the torque demand of the second motor matches the torque demand allocated to the first motor.

10. A dual motor drive assembly according to claim 1 wherein the torque demand allocated to the first motor is decreased from the threshold torque value whilst the torque demand allocated to the second motor is increased at a greater rate in order to provide a greater total torque.

11. A dual motor drive assembly according to claim 10 wherein the torque demands allocated to the second motor are increased to match the torque demand allocated to the first motor.

12. A dual motor drive assembly according to claim 1 wherein when the torque demands allocated to both motors is equal, the torque demand of both motors is increased equally to provide an increased total torque demand.

13. A method of operating a dual motor drive assembly, the dual motor drive assembly comprising:

a housing; a shaft rotatably mounted with respect to the housing; a first gear connected to and configured to rotate with the shaft; first and second motors, each having an output driving a respective output gear, the output gears being engaged with the first gear; and wherein the method comprises:

allocating torque demands to each of the first and second motors;

assigning a threshold torque demand to each motor, the threshold torque demand being lower than a maximum torque output of the motor, wherein when the allocated torque demand to each motor is less than the threshold torque demand for each motor respectively, the motors are allocated torques in opposing directions, and wherein when the allocated torque demand to one motor reaches or exceeds the threshold torque demand, the other motor switches torque direction such that both motors have the same torque direction.

14. A method according to claim 13 wherein the threshold torque demand is assigned depending on one or more operating conditions.

15. A method according to claim 14 wherein the threshold torque demand is assigned depending on one or more measured or calculated parameters.

16. A method according to claim 13 wherein the threshold torque demands is a fixed torque value.

17. A method according to claim 13 wherein the threshold torque demand is a fixed, or pre-determined, range.

18. A method according to claim 13 wherein the threshold torque demand is variable.

19. A dual motor drive assembly comprising:

a housing;

a shaft rotatably mounted with respect to the housing;

a first gear connected to and configured to rotate with the shaft;

first and second motors, each having an output driving a respective output gear, the output gears being engaged with the first gear;

a controller configured to allocate torque demands to each of the first and second motors;

wherein a threshold torque demand is assigned to each motor, the threshold torque demand being lower than a respective maximum torque output of that motor, wherein when the allocated torque demand to each motor is less than the threshold torque demand for each motor respectively, the motors are allocated torques in opposing directions, wherein when the allocated torque demand to one motor reaches or exceeds the threshold torque demand, the other motor switches torque direction such that both motors have the same torque direction, wherein the threshold torque demand assigned to each motor is fixed or variable wherein the threshold torque demand comprises a fixed pre-determined torque demand range, and wherein the threshold torque value is variable within the pre- determined range.

* * * * *